United States Patent

Frazier

[15] 3,645,827
[45] Feb. 29, 1972

[54] APPARATUS FOR INCORPORATING TIRE BEADS INTO A TIRE

[72] Inventor: Larry C. Frazier, Sun City, Ariz.
[73] Assignee: National-Standard Company, Niles, Mich.
[22] Filed: Feb. 19, 1970
[21] Appl. No.: 12,774

[52] U.S. Cl.............................................156/401, 156/403
[51] Int. Cl........................................................B29h 17/22
[58] Field of Search..................156/131, 132, 398, 400, 401, 156/402, 403

[56] References Cited

UNITED STATES PATENTS

| | | | |
|---|---|---|---|
| 3,490,980 | 1/1970 | Mallory et al.......................... | 156/401 |
| 3,560,301 | 2/1971 | Cantarutti.............................. | 156/401 |
| 3,268,382 | 8/1966 | Urbon.................................... | 156/401 |

*Primary Examiner*—Samuel W. Engle
*Assistant Examiner*—Stephen C. Bentley
*Attorney*—Johnson, Dienner, Emrich, Verbeck & Wagner

[57] ABSTRACT

Tire-building apparatus embodying combined tire bead holder and ply turnup means having bead placer means embodying bead finger frame means carrying bead-supporting fingers which in a one position of the bead finger frame means hold tire beads concentrically against tire bead shoulders inwardly of outer end portions of tire carcass material supported around first inflatable bag means which provides for displacing the bead finger frame means to another position freeing the bead supporting finger means from the beads while the bead placer means hold the beads against the tire bead shoulders, in which the bead placer means is moved outwardly by further expansion of the first inflatable bag means and the tire beads are further encased in the outer end portions of the tire carcass material, and in which the tire bead holder and ply turnup means are then moved axially to effect displacement of the outer end portions of the tire carcass material on the inflatable bag means to fully encase the beads in the outer end portions of the tire carcass material. The apparatus, as noted, embodying second inflatable bag means operative in association with the first bag means to permit upon inflation of the first inflatable bag means movement of the bead finger from the bead, and the apparatus as first noted in which the tire bead holder and ply turnup means embody sidewall pusher means for applying sidewall components to the tire carcass material after the latter is formed into a substantially torous configuration.

Method of building a tire in which tire carcass material is formed with tire bead shoulders from which outer end portions of tire carcass material extend, supporting tire beads concentrically at the tire bead shoulders, freeing the support of the tire beads while maintaining the tire beads against the tire bead shoulders and partially encase the tire beads in the outer end portion of the tire carcass material, and then displacing the outer end portions of the tire carcass material over the tire beads and onto the tire carcass material at the tire beads to fully encase the tire beads.

12 Claims, 20 Drawing Figures

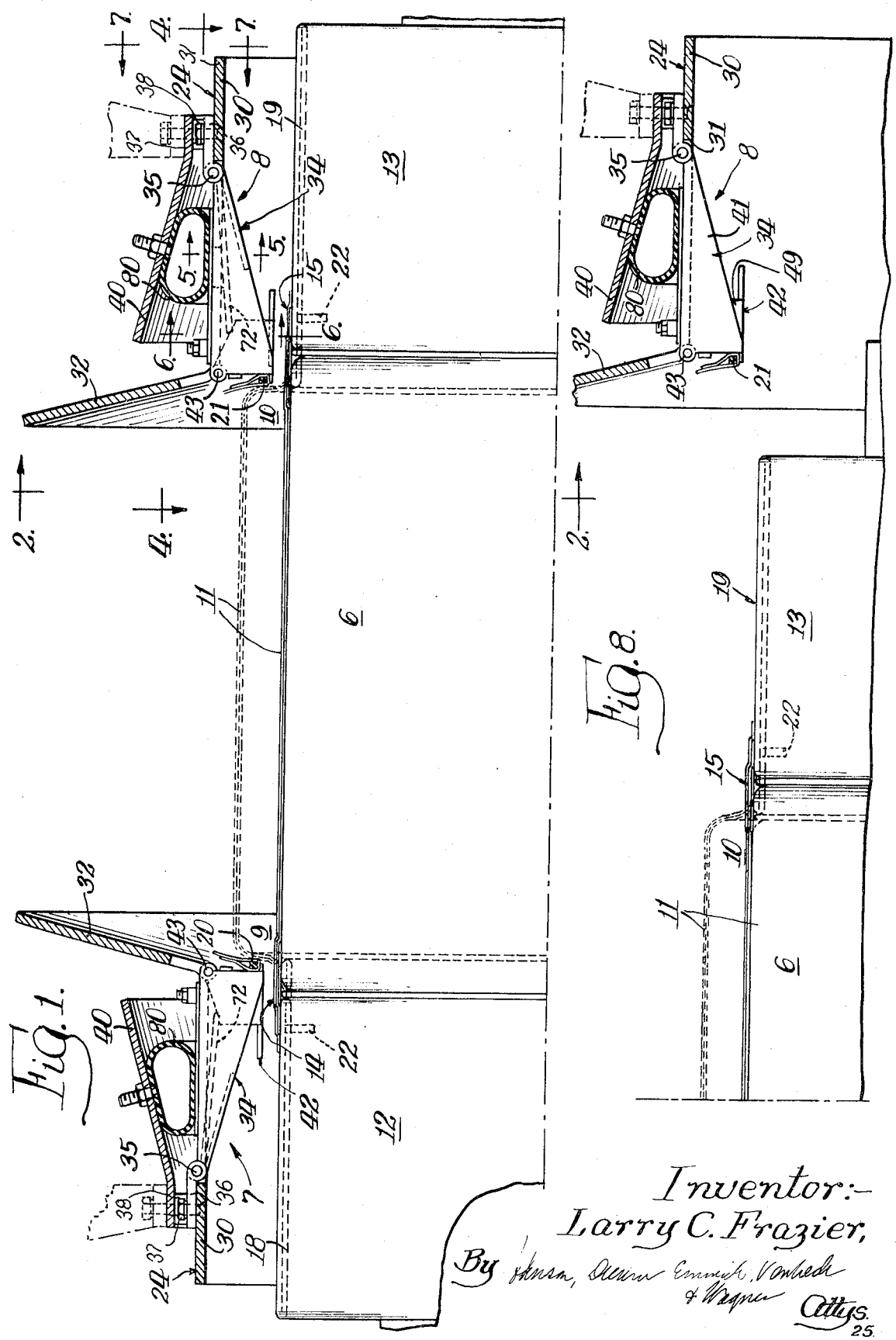

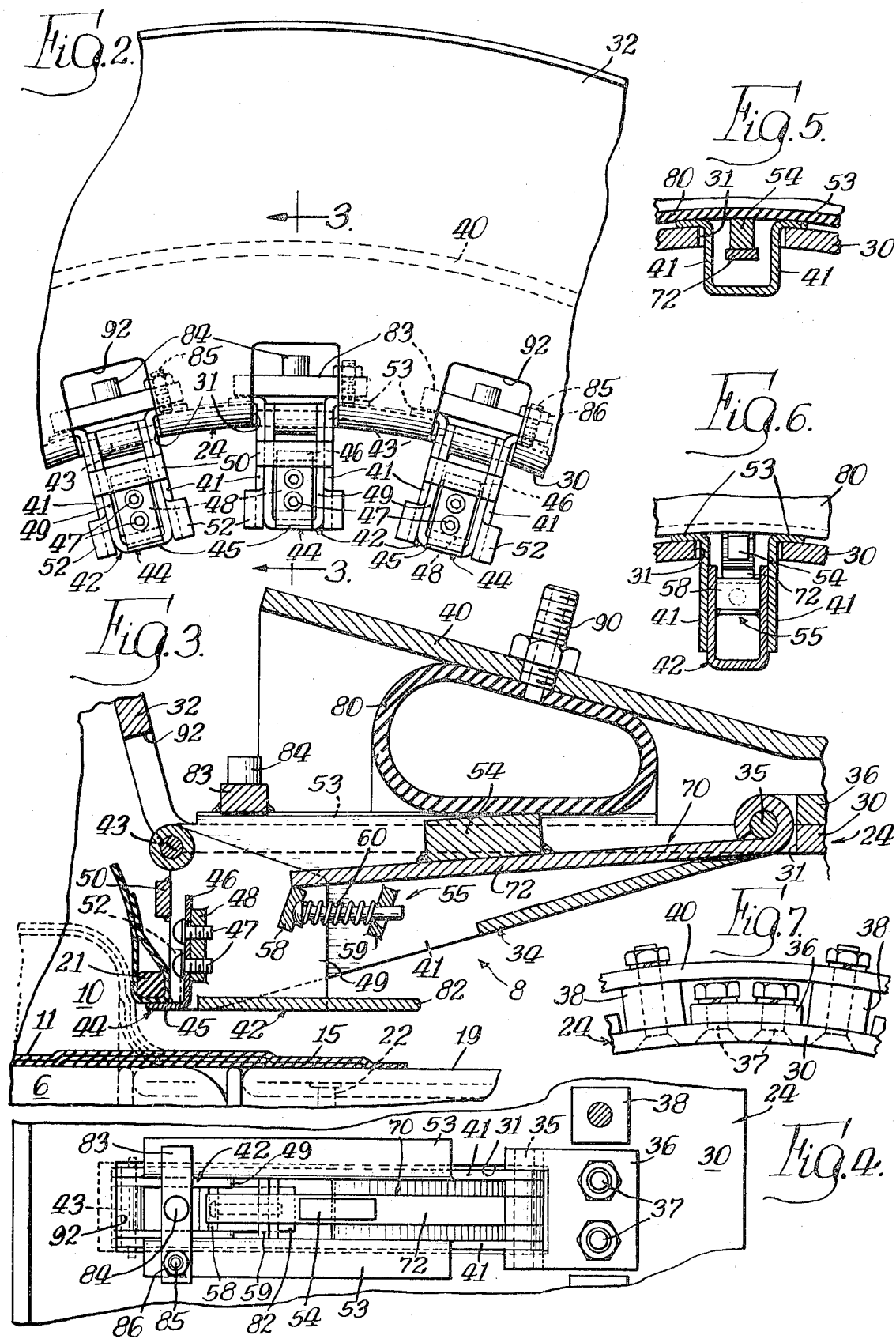

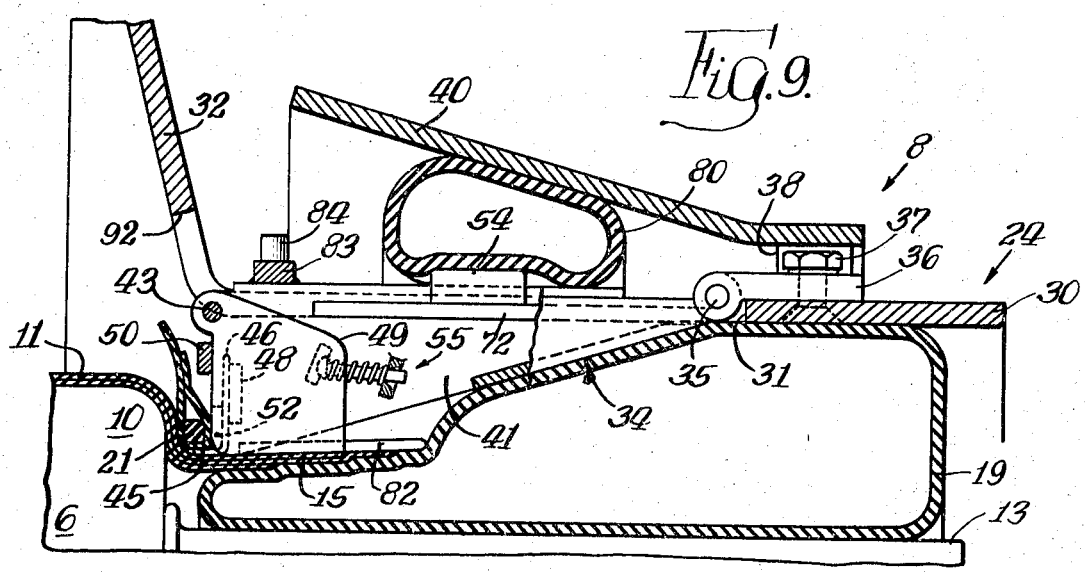
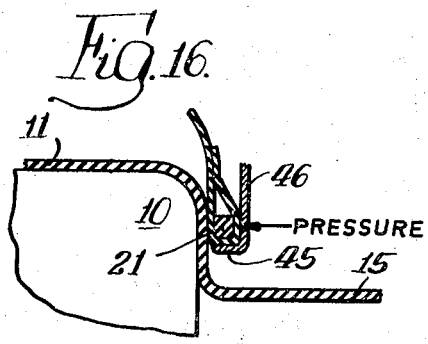
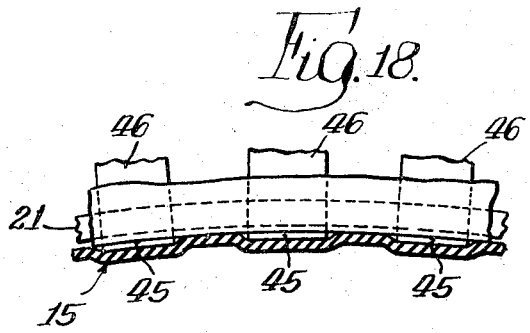
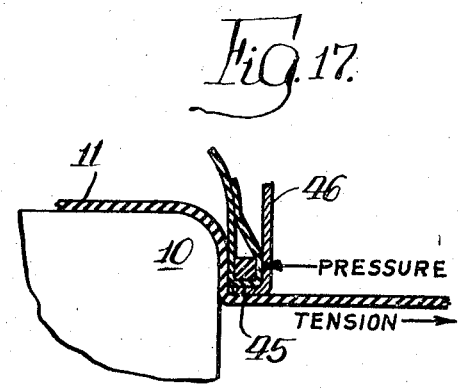
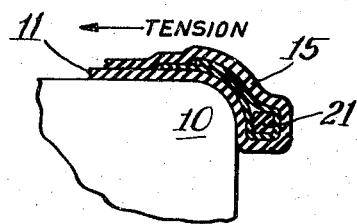
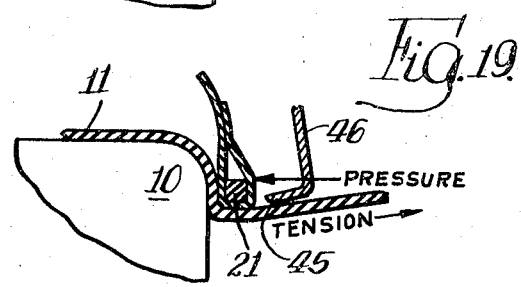

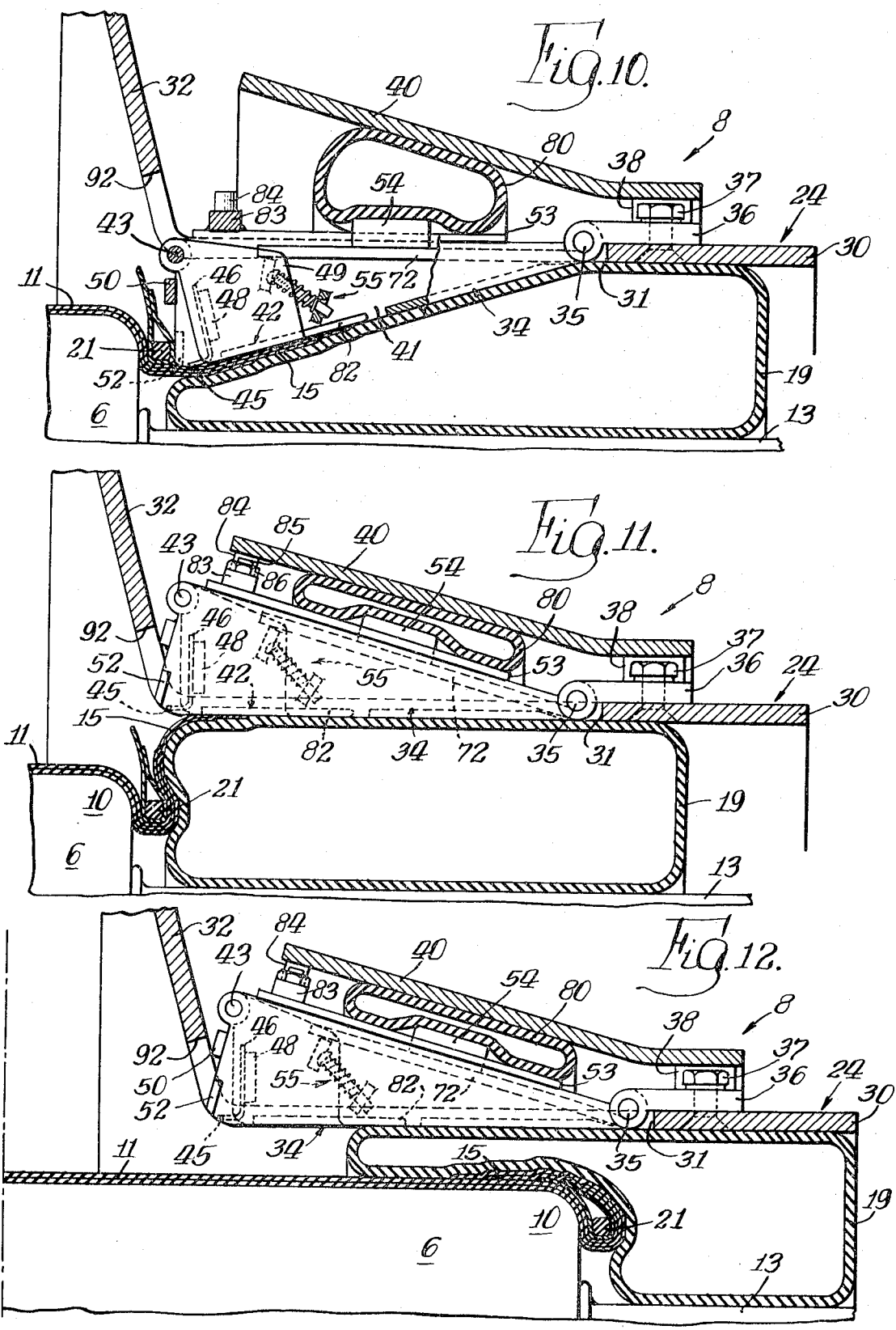

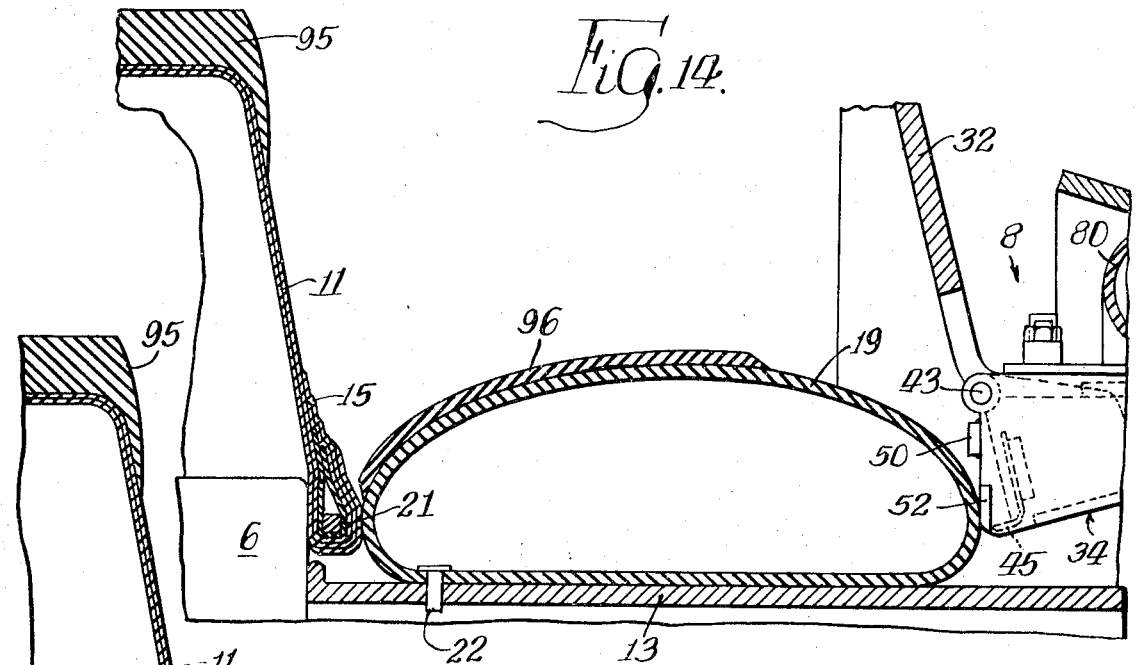
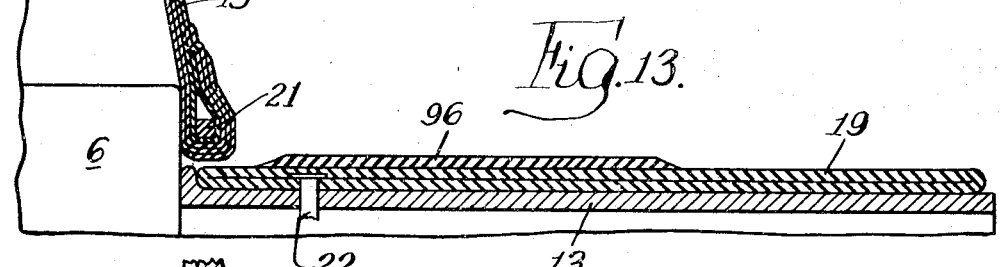
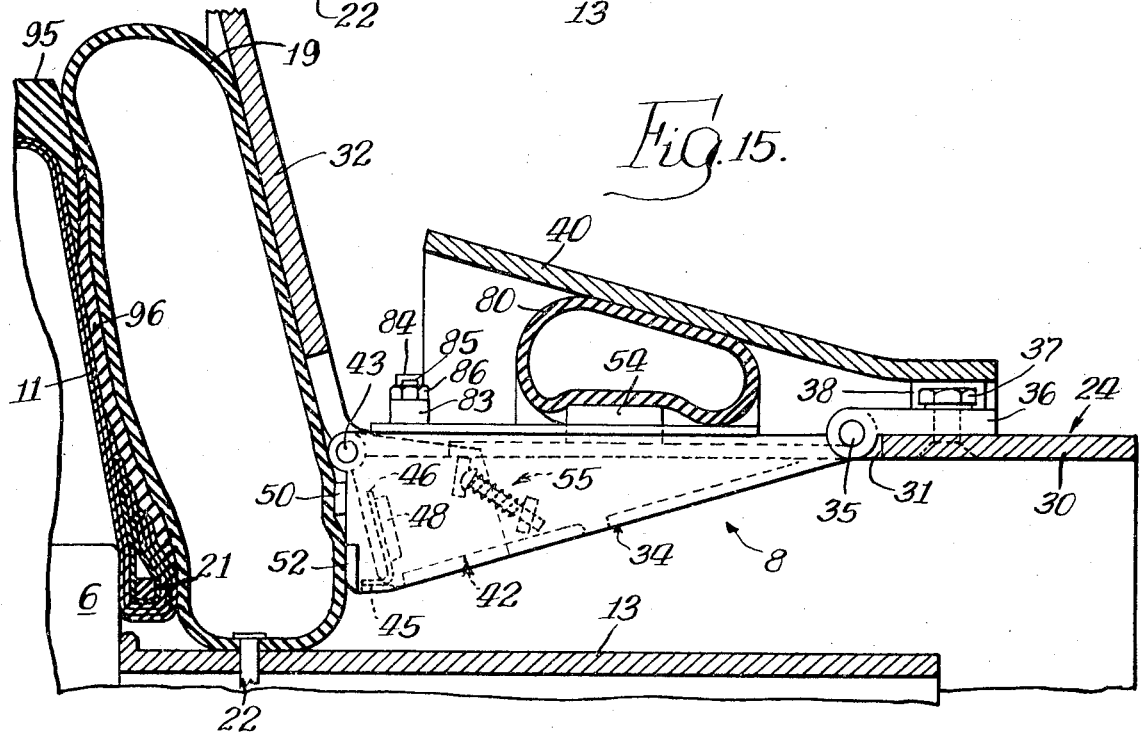

APPARATUS FOR INCORPORATING TIRE BEADS INTO A TIRE

BACKGROUND

In the building of tires, it is conventional practice to dispose a tire bead inwardly of each of the opposite end portions of tire carcass material the intermediate portion of which is supported on a drum to define tire bead shoulders, with the tire beads being held in place against the shoulders by adhesion of the gums of the tire carcass material and tire beads. Thereafter the opposite outer end portions of the tire carcass material are turned over the tire beads and adhered to the portions of the carcass material axially inwardly of the tire bead shoulders. This widely employed practice is of disadvantage especially when, as is frequently the case, tire beads are elliptical rather than of true circular configuration. In such instances even after application of a tire bead against a tire bead shoulder of tire carcass material supported on a drum by a circular bead-placing ring, upon removal of the bead-placing ring to enable turning up the ends of the tire carcass material, the tire bead will frequently resume its elliptical configuration in that the adhesion of the holding gums is insufficient to retain the tire bead circular or concentric with respect to the drum. Thus such a tire bead is not properly incorporated in the tire.

The art sought to overcome the disadvantage of the foregoing practice by embodying radially expansible bead holding means lying inwardly of the carcass material on an inflatable main drum, in which expansible tire bead holding means are radially outwardly expanded against the inflatable drum to hold the tire beads in predetermined fixed relation around the tire carcass material. In such an arrangement of parts an inflatable main drum is highly unsatisfactory in that it does not provide a firm tire-building surface. In addition, separate mechanisms are provided for making the turnups of the ends of the carcass material over the tire beads. This approach to the problem requires separate structures for holding the tire beads and making the turnups and adds to the complexity of operation of the tire-building apparatus.

It is also known prior to my present invention in order to avoid the aforenoted disadvantages to provide tire-building apparatus embodying combined tire bead holder and turnup means which serve to retain a tire bead concentric with the building drum until a tire bead is partially encased by the carcass material, and after which the turnup is completed to fully encase the tire bead in the carcass material.

THE INVENTION

The present invention comprehends the provision of improved tire bead holder and ply turnup means in which a plurality of supporting fingers in one position thereof provide for supporting tire beads concentrically at the ends of tire bead shoulders formed at the ends of tire carcass material mounted on a drum. The tire bead holder and ply turnup means also comprises first inflatable bag means supported to extend axially outwardly of each of the bead shoulders for supporting end portions of the tire carcass material, and which, when initially inflated axially outwardly tensions the end portions of the tire carcass material and first effects partial encasing of portions of the tire beads with the end portions of the tire carcass material, and thereafter upon further expansion of the inflatable bag means freeing of the supporting fingers from the tire beads, while maintaining the tire beads against the tire bead shoulders to effect further encasing of the tire beads in the outer ends of tire carcass material. Upon radial outward followed by axial inward movement of the tire bead holder and ply turnup means toward each other the end portions of the tire carcass material are displaced over the tire beads to fully encase them in the end portions of the tire carcass material.

An important feature of the invention resides in the provision of spring means operative to bias bead finger frame means carrying bead-supporting fingers to a first or operative position for supporting a tire bead in concentric relation to a bead shoulder of a tire-building drum, and in which the first inflatable bag means upon appropriate inflation thereof biases said bead finger frame means to an inoperative position at which the bead-supporting fingers are free of the tire beads.

Another important feature of the invention resides in providing overcenter spring means operative to yieldingly hold the bead finger frame means in its foregoing operative and inoperative positions.

The invention further is concerned with the provision of second inflatable bag means lying outwardly of the ends of the tire bead holder and ply turnup means which, when energized, take the reaction of the first inflatable bag means when inflated to initiate freeing of the supporting fingers from the tire beads and turning up of the outer ends of the tire carcass material as above mentioned. Additionally, sidewall applying means of the invention includes sidewall pusher means for engagement with the first inflatable bag means to assemble sidewall components to tire carcass material after formation of the latter into substantially torous configuration by radial displacement of the tire carcass material on the drum.

The invention is also concerned with the method of building a tire in which tire beads are held against tire bead shoulders inwardly of outer end portions of the tire carcass material, in which the tire beads are initially supported concentrically at the tire bead shoulders, tensioning the outer end portion of the tire carcass material and initially partial encase portions of the tire beads, followed by freeing the support of the tire beads but holding them against the tire bead shoulders, and in which the outer end portions of the tire carcass material are further displaced to further partially encase the beads followed by displacing the end portions over the tire beads to fully encase the tire beads. The method, as last noted, in which the tire carcass material with the encased beads is then formed into substantially torous configuration for the application of sidewall components to the sides of the tire carcass material. Also other components, such as a tread component, for the tire may also be applied to the periphery of the torous configuration of the tire carcass material.

BRIEF DESCRIPTION OF THE DRAWING

FIG. 1 is a longitudinal sectional view of tire-building apparatus constructed in accordance with the present invention with the parts in position for holding tire beads against tire bead shoulders of tire carcass material on a tire-building drum;

FIG. 2 is a vertical sectional view taken along the line 2—2 on FIG. 1, looking in the direction indicated by the arrows;

FIG. 3 is an enlarged sectional view taken on the line 3—3 on FIG. 2;

FIG. 4 is a plan view taken substantially along the line 3—3 on FIG. 1;

FIG. 5 is a detail vertical sectional view taken along the line 4—4 on FIG. 1 looking in the direction indicated by the arrows;

FIG. 6 is a detail vertical sectional view taken along the line 5—5 on FIG. 1 looking in the direction indicated by the arrows;

FIG. 7 is an end elevational view taken along the line 6—6 on FIG. 1 looking in the direction indicated by the arrows;

FIG. 8 is a view of the upper right-hand quarter of the apparatus shown in FIG. 1, but showing the initial position of the parts before placing of a tire bead against a tire bead shoulder as seen in FIG. 1;

FIG. 9 is a view of the right-hand upper quarter of the apparatus but showing the position of the parts following that of the position of the parts shown in FIG. 1;

FIG. 10 is a view of the right-hand upper quarter of the apparatus of FIG. 1 but showing the position of the parts following that of the position of the parts shown in FIG. 9;

FIG. 11 is a view similar to that of FIG. 10 showing the position of the parts for encasing a substantial portion of the tire bead in the tire carcass material;

FIG. 12 is a view similar to FIG. 11 but showing the position of the parts when the tire bead is fully encased in the tire carcass material.

FIG. 13 is a view of certain of the components of FIG. 1 in initial position preparatory to applying a sidewall component to the sidewall portion of the tire carcass of torous configuration;

FIG. 14 is a view showing the position of the parts at the start of the application of a sidewall component to the sidewall of the tire carcass;

FIG. 15 is a view showing the position of the parts at which the application of the sidewall component to the sidewall portions of a tire carcass is completed; and FIGS. 16 through 20 are diagrammatic illustrations showing the sequence of encasing the beads in the end portions of the tire material.

DETAILED DESCRIPTION OF A PREFERRED EMBODIMENT OF THE APPARATUS OF THE INVENTION

Referring now to FIG. 1 there is shown a tire building apparatus comprising a main tire-building drum 6, and first and second tire bead holding and turnup means 7 and 8 disposed at opposite ends of the main drum 6. The main drum 6 may be of any desired construction to provide as shown in FIG. 1 tire bead shoulders 9 and 10 at its opposite ends adjacent the tire bead holding and turnup means 7 and 8, respectively. If desired, the drum 6 may embody, as is known, radially inwardly and outwardly and circumferentially movable segments to provide in an inner radial position thereof with drum means 12 and 13 of the tire bead holding and turnup means 7 and 8, respectively, an initial cylindrical surface for supporting tire carcass material such as shown at 11, therearound for the carcass of a tire, and which main drum 6 may then be expanded radially outwardly to provide the tire bead shoulders such as at 9 and 10. A main drum 6 of the construction referred to is preferred, but if desired other known drums may be employed, such as the radially expansible bag type of drum. Also, if desired the drum could be of the construction initially providing tire bead shoulders 9 and 10 and about which the tire carcass material with end portions of the tire carcass material as at 14 and 15 for the turnups being supported on first inflatable bag means 18 and 19, supported on the drums 12 and 13, respectively.

After laying of the tire carcass material about the main drum 6 and first inflatable bag means 18 and 19 of drums 12 and 13, respectively, as shown in FIG. 1, the shoulders 9 and 10 provide tire bead shoulders at opposite ends of the main drum for the tire beads 20 and 21, respectively.

The tire bead holding and turnup means 7 and 8 are of like construction in view of which the following description will be directed to the tire bead holding and turnup means 8 at the right-hand end of the main drum 6 and in which like reference numerals applied to the tire bead holding and turnup means 7 indicated the same or comparable parts.

The tire bead holding and turnup means 8 further comprises a port 22 providing for admission and release of fluid under pressure, such as air, into and out of the first inflatable bag 19 to inflate and deflate the latter as will be below described.

The tire bead holding and turnup means 8 further comprises a main frame 24 mounted in any suitable manner (not shown) for movement axially inwardly and outwardly relative to the main drum 6.

The main frame 24 comprises a cylindrical portion 30 provided with a plurality of lengthwise extending elongated slots 31, and a flared sidewall pusher member 32 the function of which will be below described.

Bead placer means 34 are positioned in each of the slots 31 of the cylindrical portion 30 of the main frame 24. Each bead placer means 34 is pivotally mounted as at 35 in a bracket 36 bolted as at 37 adjacent the outer end of the cylindrical portion 30. As best seen in FIGS. 4 and 7 a plurality of spacer members 38 are disposed between adjacent brackets 36 and to which as will be seen in FIGS. 1 and 3 the outer end of a cone shape tube restraining member 40 is bolted by bolts passing through the spacer members 38 and anchored in the cylindrical member 30.

Upon reference to FIGS. 2 through 6 it will be seen that each of the bead placer means 34 comprises spaced-apart sidewalls 41 between which there is located bead finger frame means 42 pivoted as at 43 at the inner upper ends of the sidewalls 41. The bead finger frame means 42 provides for the support of a bead-supporting finger member 44 having an axially extending bead-supporting flange portion 45 and a radially extending mounting portion 46. A plurality of bolts 47 are provided for securing the radially extending portion 46 of the bead finger to a transversely extending wall 48 extending between the sidewalls 49 of the bead finger frame means 42. The several bead supporting fingers 45 of each of the several bead finger frame means 42 for the support of tire bead 21 concentrically of the axis of drum 6 and adjacent tire bead shoulder 10. A crossbar 50 extends across the forward ends of sidewalls 41 below the pivot 43 to reinforce the bead placer means at its inner end. Also, the sidewalls 41 at the lower portion of the inner ends are formed with integral laterally outwardly extending bead engaging flanges 52 which as will appear support the tire bead against the tire bead shoulders in the operation of the apparatus in fabricating a tire. Also, as best seen in FIGS. 1, 2 and 3 the sidewalls 41 at their upper edges are formed with integral laterally outwardly extending flanges 53.

An overcenter spring means 55 best illustrated in FIG. 3 is arranged between bead placer means 34 and bead finger frame means 42. The overcenter spring means 55 comprises a rivet extending between a crossbar 58 extending between the sidewalls 49 of the bead finger frame means 42 and a cross frame 59 extending between sidewalls 41 of bead placer means 34. A compression spring 60 is disposed about the shank of the rivet and is under compression between the head of the rivet which is engaged with the crossbar 58 and the cross frame 59. The free end of the rivet extends freely through the cross frame 59. The arrangement is such that the aforedescribed overcenter spring means 55 in the position of the parts shown in FIG. 1 maintains the several bead finger frame means 34 in operative position for supporting a tire bead concentrically of the drum adjacent a bead shoulder.

In FIGS. 3 and 4 there is illustrated restraining means 70 for restraining movement of the aforedescribed bead finger frame means 42 from its aforedescribed operative position comprises a lever 72 pivoted at its outer end on the pivot pin 35. An abutment member 54 is carried by lever 72 and is adapted to engage a second annular inflatable bag means 80 disposed between cone member 40 and the upper end of the bead placer means 34. The inner periphery of the annular bag means 80 is supported by the flanges 53 of the side plates 41 with the spaced apart sidewalls 41 and 49 permitting pivotal movement of the lever 72 about its pivot axis. Thus as shown in FIG. 1, the first inflatable bag means 19 is deflated, and second inflatable bag means is inflated and by reason of its engagement with abutment 54 of the lever 72 holds the latter in engagement with the crossbar portion 58 of bead finger frame means 42 disposing the latter with the tire bead-supporting fingers 45 in tire bead-supporting position.

The bead finger frame means 42, see FIG. 3, is formed with a bottom wall 82 adapted to be engaged by inflatable bag means 19 upon inflation thereof for purposes described below.

It will be further noted as best seen in FIGS. 2, 3 and 4 that a crossbar 83 extends between and is secured to the forward end portion of flanges 53 of bead placer means 34, and from which a stop member 84 extends outwardly and upwardly for engagement in operation of the apparatus with the outer end of bag-restraining member 40 to limit outward movement of bead placer means 34 about its pivot 35. An adjusting screw 85 has threaded engagement with the crossbar 83 and at its inner end bears against the cylindrical portion 30 of frame means 24. A locknut 86 serves to retain the adjusting screw 85 in adjusted position. Thus the adjusting screw 85 provides for disposing the bead placer means 34 in a predetermined position about its pivot 35, and consequently disposes the bead finger frame means 34 in a predetermined position, which, of course, determines the position of the bead-supporting flanges 45 of the bead-supporting fingers 44. It will thus be seen that the bead-supporting flange 45 of the bead-supporting finger 44 may be positioned at different predetermined diameters and that the adjusting screw 85 associated with crossbar 83 of each of the several bead placer means 34 provides for the microadjustment of the several bead-supporting fingers 44 to accurately fit the inside diameter of a tire bead to be supported on the bead-supporting fingers 44. Bead supporting fingers 44 of any desired dimension may be readily incorporated in the apparatus and the aforedescribed adjusting means provides for the fine adjustment of the several fingers to accurately support a tire bead in true concentric relation to the shoulder of a tire-building drum.

Operation of Apparatus and Description of Method

As shown in FIG. 1 the tire carcass material 11 is disposed around the main drum 6 and the end drums 12 and 13 providing tire bead shoulders at 9 and 10 at the ends of the main drum 6. The tire bead holding and turnup means 7 and 8 are shown in FIG. 1 in their axially inner positions disposing the beads 20 and 21, respectively, at the tire bead shoulders 9 and 10. The tire bead holding and turnup means at the start of a tire-building operation are disposed axially away from the drum as illustrated in FIG. 8 and in the latter position the tire beads are mounted on the bead-supporting fingers 45. Thereafter the tire bead holding and turnup means 7 and 8 are moved axially inwardly to the positions shown in FIG. 1. The tire beads 20 and 21 as shown in FIG. 1 and as diagrammatically shown in FIG. 16 are in concentric supported relation with respect to the tire bead shoulders 9 and 10. The following description beginning with FIG. 9 will be with reference to the upper right-hand portion of the apparatus shown in FIG. 1.

In the position of the parts as shown in FIG. 9 the second inflatable bag means 80 of the tire bead holding and ply turnup means 8 is charged with fluid under pressure through the stem 90 holding bead placer frame means 80 in the position illustrated. In this position the first inflatable bag means is initially inflated to axially outwardly tension the outer end portions 14 and 15 of the tire carcass material as diagrammatically illustrated in FIG. 17 from which together with FIGS. 9 and 18 that portions of the outer end portions of the tire carcass material are stitched or applied to the portions of the tire beads between the circumferentially spaced-apart bead-supporting fingers 44. Thereafter and as best seen in FIGS. 10 and 19 the second inflatable bag means 80 of the tire bead holding and ply turnup means 8 remains charged with fluid under pressure through the stem 90 holding bead placer frame means 34 in the position illustrated. Fluid under increased pressure is then admitted through stem 22 into the first inflatable bag means 19. The flanges 52 of bead placer frame means are held in engagement with the tire bead 21. As the first inflatable bag means 19 is further inflated and as shown in FIG. 10, the tensioned outer end portion 15 of the tire carcass material is clamped between the first inflatable bag means 19 and the bottom wall 82 of bead finger frame means 42. Continued inflation of the first inflatable bag means 19 effects pivoting of the bead finger frame means 42 to the position shown in FIG. 10 in which the bead finger frame means 42 has pivoted around pivot pin 43 withdrawing or freeing the bead-supporting portions 45 of the fingers 44 away from the inner periphery of the tire bead 21. During the last-noted continued inflation of bag means 19 the overcenter spring means 55 is being moved toward tripping position and when fully tripped as shown in FIG. 10 the bead-supporting fingers 45 are freed from the beads 21. Overcentering of the spring means 55 is achieved by engagement of abutment 54 with second bag means 80 resisting movement of lever 72 until the latter reaches a position at which the crossmember 59 passes center with the bead finger frame means 44 moving to the position shown in FIG. 10. The inwardly facing flanges 52 of the bead placer means 34 remain in engagement with the bead 21 and continue to hold the bead in tight engagement with the tire carcass material at the bead shoulder 10.

As will next be seen in FIG. 11 upon continued inflation of the first bag means 19 and the controlled deflation of the second bag means 80, the bead placer means 34 is pivoted about its pivot 35 to dispose the bead placer means 34 as well as the bead finger frame means 42 radially outwardly of the periphery of the main drum 6. A cutout 92 in the sidewall pusher member 32 provides for disposal of the bead finger frame means 42 to the position shown. Also the inner end portion of first bag means 19 has expanded radially outwardly laying the tire carcass material on the outer side surface of tire bead 21. With the parts in the position shown in FIG. 11 from which it will be seen that the outer end portion 15 of the tire carcass material is secured between the bead placer means 34 and the first inflatable bag means 19, initiation of the turnup is effected by axial inward movement of the tire bead holder and ply turnup means 8 toward and over the main drum 6. In this position of the parts the axial inward movement of the tire bead holding and turnup means 8, as shown in FIG. 12, and diagrammatically in FIG. 20 has effected differential rolling under tension of the outer end portion 15 of the tire carcass material 11 over the tire bead 21 and onto the tire carcass material on the main drum axially inwardly of the tire bead shoulder 10 to complete the ply turnup. It will be noted from FIG. 11 that upon energization of the first inflatable bag means 19 and the deflation of the second bag means 80 the first inflatable bag means 19 conditions the parts for movement of the bead placer means 34 to its radial inner position for effecting differential rolling of the outer end portion 15 of the tire carcass material in forming the ply turnup. After formation of the ply turnup the tire bead holding and ply turnup means are returned to the axially outer end positions.

The invention as thus far described has utility for incorporating tire beads in tire carcass material as, for example, in the fabrication of a bias angle tire. In such instance the tire carcass material with the encased beads may be removed from the main tire building drum 6 for further known fabrication operations. However, should the apparatus and method of the invention be employed in the fabrication of radial tires, the main drum 6 is of a character to effect radial expansion of the tire carcass material into torous configuration as shown in FIG. 13. With the tire carcass material in torous configuration a tire tread component as indicated at 95 may be applied to the outer periphery thereof. Also, the invention lends itself to the application of sidewall components to the sides of the tire carcass material of torous configuration. For this purpose and as shown in FIG. 13, which again illustrates the upper right-hand quadrant of the apparatus, the tire bead holding and ply turnup means 8 has been retracted exposing the deflated first bag means 19, and a sidewall component 96 has been applied to the deflated first bag means 19. Thereafter, and as shown in FIG. 14, the first inflatable bag means 19 is inflated and the tire bead holding and ply turnup means 8 is advanced axially toward the main drum 6 engaging the inner end of bead placer frame means 34 with the outer end of inflated first bag means 19. The second inflatable bag means 80 is in fully inflated condition. Upon continued inflation of the first inflatable bag means 19 and axially advancing of the tire bead holding and ply turnup means 8 in a direction toward the main drum 6, the sidewall component 96 is laid up against and stitched to the sidewall portion of the tire carcass material by pressure applied to the first inflatable bag means 19 by sidewall pusher plate 32 and the inner end of bead placer frame means 34. After completion of the application of the sidewall component 96, the first bag means 19 is deflated and the tire bead holding and ply turnup means 8 retracted to its FIG. 8 starting position, and upon collapsing of the main drum 6, the formed tire carcass having beads encased therein together with the applied tread component and sidewall components may be removed from the drum for further fabrication operations.

The invention claimed is:

1. In a tire-building apparatus having a main tire-building drum, the combination of first tire bead holding and ply turnup means comprising turnup drum means including a turnup drum on a common axis with one end of said main drum, and first inflatable bag means on said turnup drum, said main drum and said turnup drum means providing for the support thereon of tire carcass material for the carcass of a tire, said tire bead holding and ply turnup means comprising bead placer means, bead finger frame means mounted on said bead placer means having a plurality of circumferentially spaced-apart bead-supporting fingers which in a first position of said bead finger frame means support a tire bead concentrically against a tire bead shoulder at one end of the main drum and inwardly of an outer portion of the tire carcass material supported on said turnup drum means, said first inflatable bag means upon predetermined inflation thereof moving said bead finger frame means to a second position to free said bead-supporting fingers from the tire bead while said bead placer means holds the tire bead against the tire bead shoulder and tensioning said outer end portion of said tire carcass material axially outwardly and engaging the same with the tire bead and said first inflatable bag means upon further predetermined inflation thereof disposing said bead placer means radially outwardly of said main drum so that upon moving of said bead placer means while in its radial outer position axially inwardly toward said main drum the outer end portion of said tire carcass material is displaced by said bead placer means over the tire head and into engagement with the tire carcass material on said main drum at the bead shoulder.

2. In a tire-building apparatus having a main tire-building drum, the combination of first tire bead holding and ply turnup means comprising turnup drum means including a turnup drum on a common axis with and at one end of said main drum, and first inflatable bag means on said turnup drum, said main drum and said turnup drum means providing for the support thereon of tire carcass material for the carcass of a tire, said tire bead holding and ply turnup means comprising bead placer means, bead finger frame means mounted on said bead placer means having a plurality of circumferentially spaced-apart bead-supporting fingers which in a first position of said bead finger frame means support a tire bead concentrically against a tire bead shoulder at one end of the main drum and inwardly of an outer portion of the tire carcass material supported on said turnup drum means, said first inflatable bag means upon predetermined inflation thereof moving said bead finger frame means to a second position to free said bead-supporting fingers from the tire bead while said bead placer means holds the tire bead against the tire bead shoulder and disposing said outer end portion of said tire carcass material between said first inflatable bag and said bead placer means, said first inflatable bag means upon further predetermined inflation thereof disposing said bead placer means radially outwardly of said main drum so that upon movement of said bead placer means while in its radial outer position axially inwardly toward said main drum the outer end portion of said tire carcass material is displaced by said bead placer means over the tire bead and into engagement with the tire carcass material of said main drum at the bead shoulder, and in which said first inflatable bag means is adapted upon initial inflation thereof prior to inflation for moving said bead finger frame means to said second position for initially axially outwardly tensioning said outer end of said tire carcass material and to engage portions of said tire carcass material with said tire bead between said circumferentially spaced-apart bead-supporting fingers.

3. The tire building apparatus of claim 2 including second inflatable bag means carried by said bead placer means adapted to be inflated for preventing outward movement of said bead placer means upon said initial and said first predetermined expansion of said first inflatable bag means.

4. The tire building apparatus of claim 3 comprising means for deflating said second bag means to permit movement of said bead placer means to its position radially outwardly of said main drum by said further predetermined inflation of said first bag means.

5. The tire building apparatus of claim 2 in which adjusting means carried by said bead placer means provides for adjusting the radial positions of said bead-supporting fingers.

6. The tire building apparatus of claim 2 in which said main drum is radially expansible to form the tire carcass material into torous configuration, and in which said first inflatable bag means is adapted to support a sidewall component for application to one side of the tire carcass material of torous configuration comprising first sidewall pusher means carried by said bead placer means, and said first sidewall pusher means and said bead placer means being adapted to engage said first inflatable bag means upon predetermined inflation thereof for applying the sidewall components to the sidewall portion of the tire carcass.

7. The tire building apparatus of claim 1 characterized by the provision of second tire bead holding and ply turnup means corresponding to said first tire bead holding and ply turnup means at the other end of said main drum.

8. The tire building apparatus of claim 2 characterized by the provision of second tire bead holding and ply turnup means corresponding to said first tire bead holding and turnup means at the other end of said main drum.

9. In a tire-building apparatus having a main tire-building drum, the combination of first tire bead holding and ply turnup means comprising turnup drum means including a turnup drum on a common axis with and at one end of said main drum, and first inflatable bag means on said turnup drum, said main drum and said turnup drum means providing for the support thereon of tire carcass material for the carcass of a tire, said tire bead holding and ply turnup means comprising bead placer means, bead finger frame means mounted on said bead placer means having a plurality of circumferentially spaced-apart bead-supporting fingers which in a first position of said bead finger frame means support a tire bead concentrically against a tire bead shoulder at one end of the main drum and inwardly of an outer portion of the tire carcass material supported on said turnup means, said first inflatable bag means upon predetermined inflation thereof moving said bead finger frame means to a second position to free said bead-supporting fingers from the tire bead while said bead placer means holds the tire bead against the tire bead shoulder and disposing said outer end portion of said tire carcass material between said first inflatable bag and said bead placer means, said first inflatable bag means upon further predetermined inflation thereof disposing said bead placer means radially outwardly of said main drum so that upon movement of said bead placer means while in its radial outer position axially inwardly toward said main drum the outer end portion of said tire carcass material is displaced by said bead placer means over the tire bead and into engagement with the tire bead carcass material on said main drum at the bead shoulder, said second tire bead holding and ply turnup means corresponding to said first tire bead holding and ply turnup means at the other end of said main drum and second inflatable bag means and second sidewall pusher means corresponding to said first inflatable bag means and said first sidewall pusher means for applying a sidewall component to the other side of the tire carcass material of torous configuration.

10. The tire building apparatus of claim 9 characterized by the provision of second inflatable bag means and second sidewall pusher means corresponding to said first inflatable bag means and said first sidewall pusher means for applying a sidewall component to the other side of the tire carcass material of torous configuration.

11. The tire building apparatus of claim 2 characterized by the provision of overcenter spring means between said bead placer means and said bead finger frame means for normally restraining movement of said bead finger frame means from one to another of its first and second positions.

12. The apparatus of claim 9 characterized by the provision of second inflatable bag means and restraining between said second inflatable bag means and said bead finger frame means for restraining movement of the latter from its first position to its second position.